(12) United States Patent
Kim

(10) Patent No.: US 8,401,523 B2
(45) Date of Patent: Mar. 19, 2013

(54) APPARATUS AND METHOD FOR CONTROLLING QUALITY OF SERVICE OF MASTER BLUETOOTH TERMINAL IN PICONET

(75) Inventor: In-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 738 days.

(21) Appl. No.: 12/570,802

(22) Filed: Sep. 30, 2009

(65) Prior Publication Data

US 2010/0015920 A1 Jan. 21, 2010

(30) Foreign Application Priority Data

Jul. 10, 2008 (KR) ........................ 10-2008-0098392

(51) Int. Cl.
*H04W 40/00* (2009.01)
(52) U.S. Cl. .... 455/412; 455/41.2; 455/500; 455/553.1; 455/343.1; 455/574; 455/408; 455/411; 455/414; 370/229; 370/346; 370/444; 370/329; 370/338
(58) Field of Classification Search .................. None
See application file for complete search history.

(56) References Cited

U.S. PATENT DOCUMENTS

| | | | |
|---|---|---|---|
| 7,647,023 B2 * | 1/2010 | Grushkevich | 455/41.2 |
| 7,881,746 B2 * | 2/2011 | Desai | 455/552.1 |
| 8,085,834 B2 * | 12/2011 | Hanke et al. | 375/220 |
| 8,086,177 B2 * | 12/2011 | Trift et al. | 455/41.2 |
| 2005/0002372 A1 * | 1/2005 | Rune et al. | 370/346 |
| 2005/0163047 A1 * | 7/2005 | McGregor et al. | 370/229 |
| 2008/0125039 A1 * | 5/2008 | Glinka | 455/41.2 |

* cited by examiner

*Primary Examiner* — Fayyaz Alam
*Assistant Examiner* — Mohammed Rachedine
(74) *Attorney, Agent, or Firm* — The Farrell Law Firm, P.C.

(57) ABSTRACT

An apparatus for controlling Quality of Service (QoS) of a master Bluetooth® terminal in a piconet. A file-specific band setting unit sets information about files and information about bandwidths set for the files, which are stored in the master Bluetooth® terminal, for a content meta database. A QoS controller checks the content meta database when an arbitrary slave Bluetooth® terminal requests file download service, and provides the set bandwidth information of the corresponding file. A balancing Bluetooth® Network Encapsulation Protocol (BNEP) creates a virtual interface when the slave Bluetooth® terminal is accessed, and sets a bandwidth of the virtual interface, which is set for the slave Bluetooth® terminal requesting the download service, to a bandwidth of the corresponding file when the set bandwidth information of the file for which the download service is requested is received from the QoS controller, and provides the download service to the slave Bluetooth® terminal.

6 Claims, 3 Drawing Sheets

FIG. 1
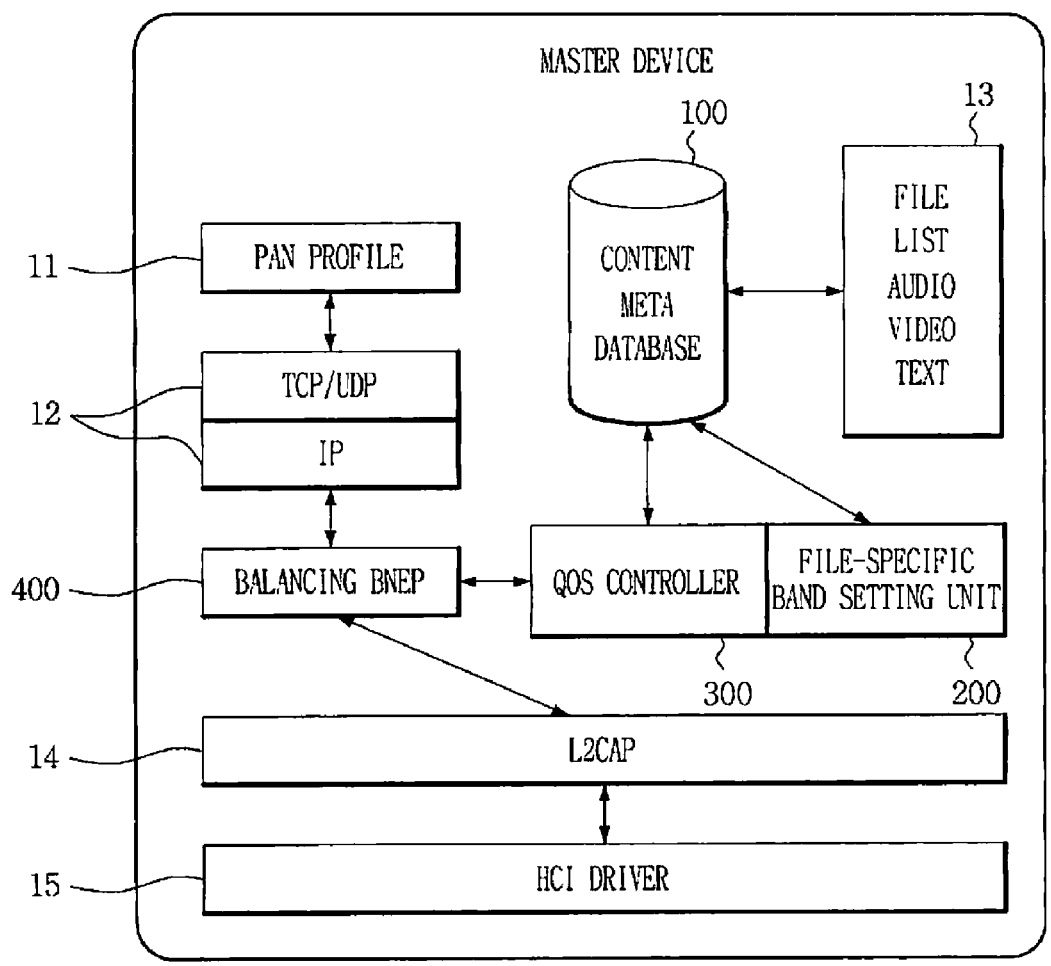
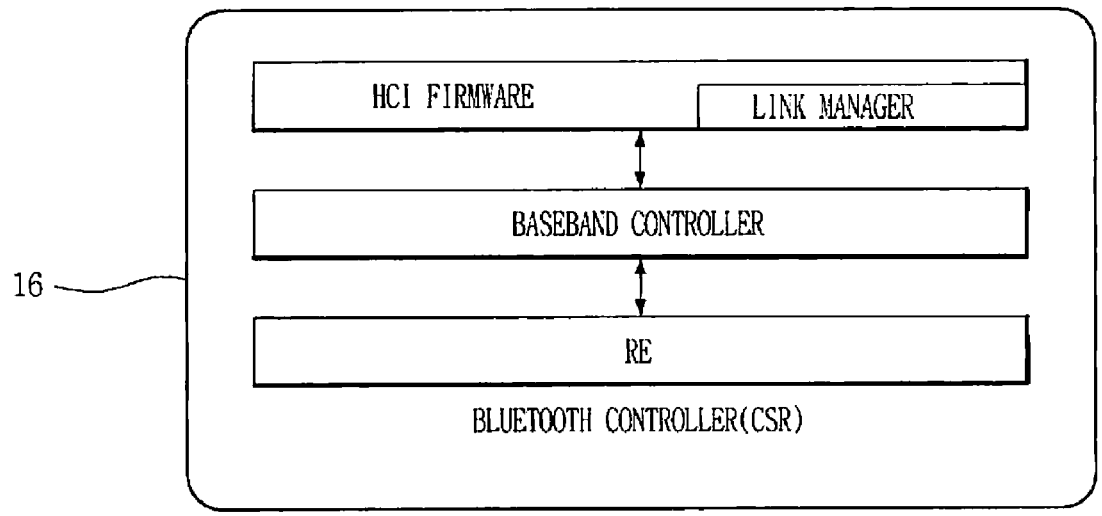

APPARATUS AND METHOD FOR CONTROLLING QUALITY OF SERVICE OF MASTER BLUETOOTH TERMINAL IN PICONET

This application claims priority under 35 U.S.C §119(a) to an application entitled "APPARATUS AND METHOD FOR CONTROLLING QUALITY OF SERVICE OF MASTER BLUETOOTH TERMINAL IN PICONET" filed in Korean Intellectual Property Office on Oct. 7, 2008 and assigned Serial No. 2008-0098392, the contents of which are incorporated herein by reference.

BACKGROUND OF THE INVENTION

1. Field of the Invention

The present invention relates generally to an apparatus and method for controlling the Quality of Service (QoS) of a master Bluetooth® terminal in a piconet, capable of being applied to various portable devices such as personal digital assistants, laptop computers, personal computers and smart phones, using a Bluetooth® interface.

More particularly, the present invention relates to a method of enabling as many as seven slave Bluetooth® terminals to efficiently receive seamless service depending on a type and an encoding scheme of each content when the slave Bluetooth® terminals competitively download data such as music, image and text from one master Bluetooth® terminal in an environment using a Bluetooth® Personal Area Network (PAN) (hereinafter piconet) profile.

2. Description of the Related Art

Bluetooth® is technology that currently finds the most commercial use with devices in a Personal Area Network (PAN). Bluetooth® begins with IEEE 802.15.1 technology, which is presently supported and upgraded by Bluetooth® Special Interest Group (SIG).

A Bluetooth® PAN profile defined by Bluetooth® standards enables Transmission Control Protocol/Internet Protocol (TCP/IP) communication on a Bluetooth® physical layer.

Bluetooth® may establish a piconet in which one master device interconnects with up to seven slave Bluetooth® terminals, and may be configured so that, when using the PAN profile, the master device executes a web server (based on HyperText Transfer Protocol (HTTP)) or a file server (based on File Transfer Protocol (FTP)), and the slave Bluetooth® terminals receive service provided by the master device.

The PAN profile defined by Bluetooth® standards configures the piconet to be able to refrain from performing load balancing on data transmitted from the master device to the slave Bluetooth® terminals, and is designed to operate in such a manner that a maximum transfer rate supported by a Bluetooth® interface is equally distributed to the slave Bluetooth® terminals.

The Bluetooth® PAN profile has only a control message for supporting a QoS using a Logical Link and Control Adaption Protocol (L2CAP) and a Link Manager Protocol (LMP) of a Bluetooth® protocol without a control algorithm, and is highly complex in terms of implementation.

Since the Bluetooth® PAN profile is designed to provide a uniform download speed to the slave Bluetooth® terminals, the Bluetooth® PAN profile cannot dynamically perform the load balancing when a specific slave Bluetooth® terminal performs an application that requires a higher download speed or operates at a low download speed.

SUMMARY OF THE INVENTION

Accordingly, the present invention provides an apparatus and method for controlling the QoS of a master Bluetooth® terminal in a piconet, in which, when the maximum slave Bluetooth® terminals competitively download data such as music, image and text from one master Bluetooth® terminal, the master Bluetooth® terminal is allowed to set a proper download speed for the slave Bluetooth® terminals depending on a type and an encoding scheme of each content, thereby enabling each slave Bluetooth® terminal to receive a seamless and efficient service.

According to the present invention, there is provided an apparatus for controlling QoS of a master Bluetooth® terminal in a piconet, including a file-specific band setting unit for setting information about files and information about bandwidths set for the files, both of which are stored in the master Bluetooth® terminal, for a content meta database, a QoS controller for checking the content meta database when an arbitrary slave Bluetooth® terminal requests download service of the file, and for providing the information about the bandwidth set for the corresponding file, and a balancing Bluetooth® Network Encapsulation Protocol (BNEP) for creating a virtual interface when the slave Bluetooth® terminal is accessed, as well as for setting a bandwidth of the virtual interface, which is set for the slave Bluetooth® terminal requesting the download service, to a bandwidth of the corresponding file when the information about the bandwidth set for the file for which the download service is requested is received from the QoS controller, and for providing the download service to the slave Bluetooth® terminal.

The content meta database may include a policy table including file type information, encoding rate information, and the set bandwidth information, as well as a content meta table in which the file-specific band setting unit stores file name information, the file type information, and the set bandwidth information, all of which are stored in the master Bluetooth® terminal, on the basis of the policy table.

Further, the balancing BNEP may be configured to receive, after setting a virtual interface for communication with the corresponding slave Bluetooth® terminal when the slave Bluetooth® terminal requests the download service and transferring a number of the set virtual interface and a name of the file whose download service is requested to the QoS controller, a token base representing the set bandwidth information of the corresponding data file as well as a bucket informing a use status of the bandwidth from the QoS controller, and to provide dynamic QoS of the corresponding file.

According to the present invention, there is provided a method for controlling QoS of a master Bluetooth® terminal in a piconet, including setting information about files and information about bandwidths set for the files, both of which are stored in the master Bluetooth® terminal, for a content meta database, checking the content meta database when an arbitrary slave Bluetooth® terminal requests download service of the file, and providing the information about the bandwidth set for the corresponding file, and setting a bandwidth of a virtual interface to that of the corresponding file with reference to the information about the bandwidths set for the data files received from a file-specific band setting unit, and providing download service of the file to the slave Bluetooth® terminal.

The setting of the information about files and the information about bandwidths set for the files may include setting a content meta table, in which the file-specific band setting unit stores file name information, file type information and set bandwidth information, all of which are stored in the master Bluetooth® terminal, on the basis of a policy table including the file type information, encoding rate information and the set bandwidth information preset for the content meta database.

Further, the providing of the download service may include setting, when the slave Bluetooth® terminal requests the download service, a virtual interface for communication with the corresponding slave Bluetooth® terminal, and transferring a number of the set virtual interface and a name of the file for which download service is requested to the QoS controller, and receiving a token base representing the set bandwidth information of the corresponding data file and a bucket informing a use status of the bandwidth from the QoS controller and providing dynamic QoS of the corresponding file.

According to the present invention, when various portable devices such as personal digital assistants, laptop computers, personal computers and smart phones using a Bluetooth® interface establish the piconet using a PAN profile, and when the maximum slave Bluetooth® terminals competitively download data such as music, image and text from one master Bluetooth® terminal, the master Bluetooth® terminal can set a proper download speed for the slave Bluetooth® terminals depending on a type and an encoding scheme of each content, so that each slave Bluetooth® terminal can receive seamless and efficient service.

BRIEF DESCRIPTION OF THE DRAWINGS

The above and other aspects, features and advantages of the present invention will be more apparent from the following detailed description when taken in conjunction with the accompanying drawings, in which:

FIG. 1 illustrates the configuration of an apparatus for controlling QoS of a master Bluetooth® terminal in a piconet according to the present invention;

DETAILED DESCRIPTION OF THE EMBODIMENTS

Figure 2:
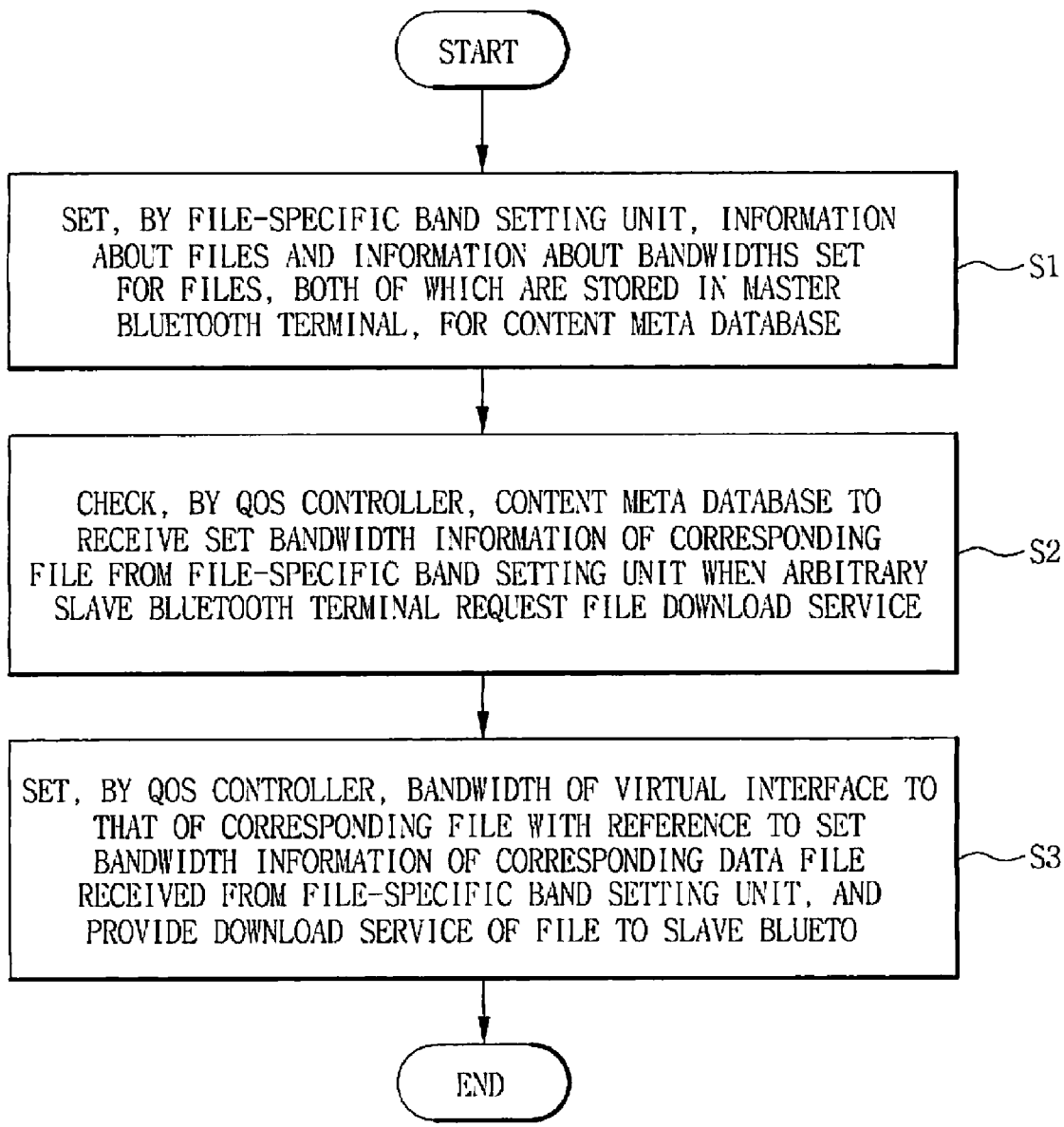
FIG. 2 illustrates a method for controlling QoS of a master Bluetooth® terminal in a piconet according to the present invention.

Hereinafter, embodiments of the present invention will be described with reference to the accompanying drawings. It should be understood by those skilled in the art that the configuration of a system described below is merely provided for description of the invention and thus the invention is not limited to the system. In the following description, a detailed description of known functions and configurations incorporated herein will be omitted for the sake of clarity and conciseness.

FIG. 1 illustrates an apparatus for controlling a QoS of a master Bluetooth® terminal in a piconet according to the present invention. The apparatus includes a PAN profile 11, a Transmission Control Protocol (TCP)/User Datagram Protocol (UDP) and an Internet Protocol (IP) 12, a storage 13, a content meta database 100, a file-specific band setting unit 200, a QoS controller 300, a balancing Bluetooth® Network Encapsulation Protocol (BNEP) 400, a Logical Link and Control Adaption Protocol (L2CAP) 14, a Host Controller Interface (HCI) driver 15, and a Bluetooth® controller 16.

The file-specific band setting unit 200 sets information about files and information about bandwidths set for the files, both of which are stored in the master Bluetooth terminal, for the content meta database 100. In other words, the file-specific band setting unit 200 stores both information about audio, video and text files and information about file type and encoding rate based on a file name, both of which are stored in the terminal, in the content meta database 100.

The QoS controller 300 checks the content meta database 100 when an arbitrary slave Bluetooth® terminal requests download service of the file, and provides the information about the bandwidth set for the corresponding file to the balancing BNEP 400.

Further, the balancing BNEP 400 creates a virtual interface when the slave Bluetooth® terminal is accessed, and sets a bandwidth of the virtual interface, which is set for the slave Bluetooth® terminal requesting the download service, to a bandwidth of the corresponding file when the information about the bandwidth set for the file for which the download service is requested is received from the QoS controller 300, and provides the download service to the slave Bluetooth® terminal.

The content meta database 100 pre-stores a policy table including the file type information, the encoding rate information, and the set bandwidth information as in Table 1, as well as a content meta table in which the file-specific band setting unit 200 stores file name information, the file type information, and the set bandwidth information, all of which are stored in the master Bluetooth® terminal as in Table 2, on the basis of the policy table.

TABLE 1

| File Type | Encoding Rate | Set Bandwidth |
|---|---|---|
| Audio (e.g., mp3) | 128 kbps | 130 kbps |
| Video (e.g., Windows Media Video WMV) | 300 kbps | 350 kbps |
| ... | | |
| Text | | |

TABLE 2

| File Name #1 | File Type | Set Bandwidth |
|---|---|---|
| File Name #2 | . | . |
| ... | . | . |
| File Name #n | . | . |

The balancing BNEP 400 sets a virtual interface for communication with the corresponding slave Bluetooth® terminal when the slave Bluetooth® terminal requests the download service, and transfers a number of the set virtual interface and a name of the file for which download service is requested to the QoS controller 300. Then, the balancing BNEP 400 receives a token base representing the set bandwidth information of the corresponding data file and a bucket informing a use status of the bandwidth from the QoS controller 300, and provides dynamic QoS of the corresponding file. The token base provides a reference value according to the set bandwidth, and the bucket serves as a counter representing the use status of the bandwidth.

General functions and detailed operations of the aforementioned components will not be described, for the sake of conciseness. Instead, the inventive operations will be described.

First, the file-specific band setting unit 200 of the master Bluetooth® terminal sets information about files and information about bandwidths set for the files, both of which are stored in the master Bluetooth® terminal, for the content meta database 100. The policy table including the file type information, the encoding rate information and the set bandwidth information as in Table 1 may be directly stored in the content meta database 100 or indirectly stored in the content meta database 100 through the file-specific band setting unit 200.

TABLE 3

| File Name | File Type | Set Bandwidth |
|---|---|---|
| xxx.mp3 | mp3 | 130 kbps. |
| yyy.wmv | WMV | 350 kbps. |
| zzz.txt | Text | 20 kbps |

In this manner, the file-specific band setting unit 200 stores the file name information, the file type information and the set bandwidth information, all of which are stored in the master Bluetooth® terminal as in Table 3, in the content meta table on the basis of the policy table stored in the content meta database 100.

When an arbitrary slave Bluetooth® terminal requests download service (e.g., xxx.mp3) of the file, the balancing BNEP 400 sets a virtual interface for communication with the corresponding slave Bluetooth® terminal, and transfers a number of the set virtual interface and a name of the file for which download service is requested to the QoS controller 300.

Then, the QoS controller 300 checks the content meta database 100 and provides the set bandwidth information (130 kbps) of the corresponding file to the balancing BNEP 400.

Continuously, the balancing BNEP 400 receives a token base representing the set bandwidth information of the corresponding data file and a bucket informing a use status of the bandwidth from the QoS controller 300, and provides a dynamic QoS of the corresponding file. In detail, the master Bluetooth® terminal sets a bandwidth to that set for the content meta database 100 without using the maximum bandwidth for the slave Bluetooth® terminal requesting the download service.

If another slave Bluetooth® terminal accesses the master Bluetooth® terminal to request download service (e.g., yyy.wmv) of the file, the balancing BNEP 400 sets a virtual interface for communication with the corresponding slave Bluetooth® terminal, and transfers a number of the set virtual interface and a name of the file for which download service is requested to the QoS controller 300.

Then, the QoS controller 300 checks the content meta database 100, and provides the set bandwidth information (350 kbps) of the corresponding file to the balancing BNEP 400.

Continuously, the balancing BNEP 400 receives a token base representing the set bandwidth information of the corresponding data file and a bucket informing a use status of the bandwidth from the QoS controller 300, and provides a dynamic QoS of the corresponding file. In detail, the master Bluetooth® terminal sets a bandwidth to that set for the content meta database 100 without using the maximum bandwidth for the slave Bluetooth® terminal requesting the download service.

The master Bluetooth® terminal sets a bandwidth for each of the other slave Bluetooth® terminals requesting the download service through the same operation process.

Now, a method for controlling a QoS of a master Bluetooth® terminal in a piconet according to the present invention will be described with reference to FIG. 2.

First, the file-specific band setting unit 200 sets information about files and information about bandwidths set for the files, both of which are stored in the master Bluetooth® terminal, for the content meta database 100 (S1). Step S1 includes setting a content meta table, in which the file-specific band setting unit 200 stores file name information, file type information and set bandwidth information, all of which are stored in the master Bluetooth® terminal, on the basis of a policy table including the file type information, the encoding rate information and the set bandwidth information preset for the content meta database 100.

When an arbitrary slave Bluetooth® terminal requests download service of the file, the QoS controller 300 checks the content meta database 100, and receives the set bandwidth information of the corresponding file from the file-specific band setting unit 200 (S2).

Then, the QoS controller 300 sets the bandwidth of a virtual interface to a bandwidth of the corresponding file with reference to the set bandwidth information of the corresponding data file received from the file-specific band setting unit 200, and provides the download service of the file to the slave Bluetooth® terminal (S3).

Figure 3:
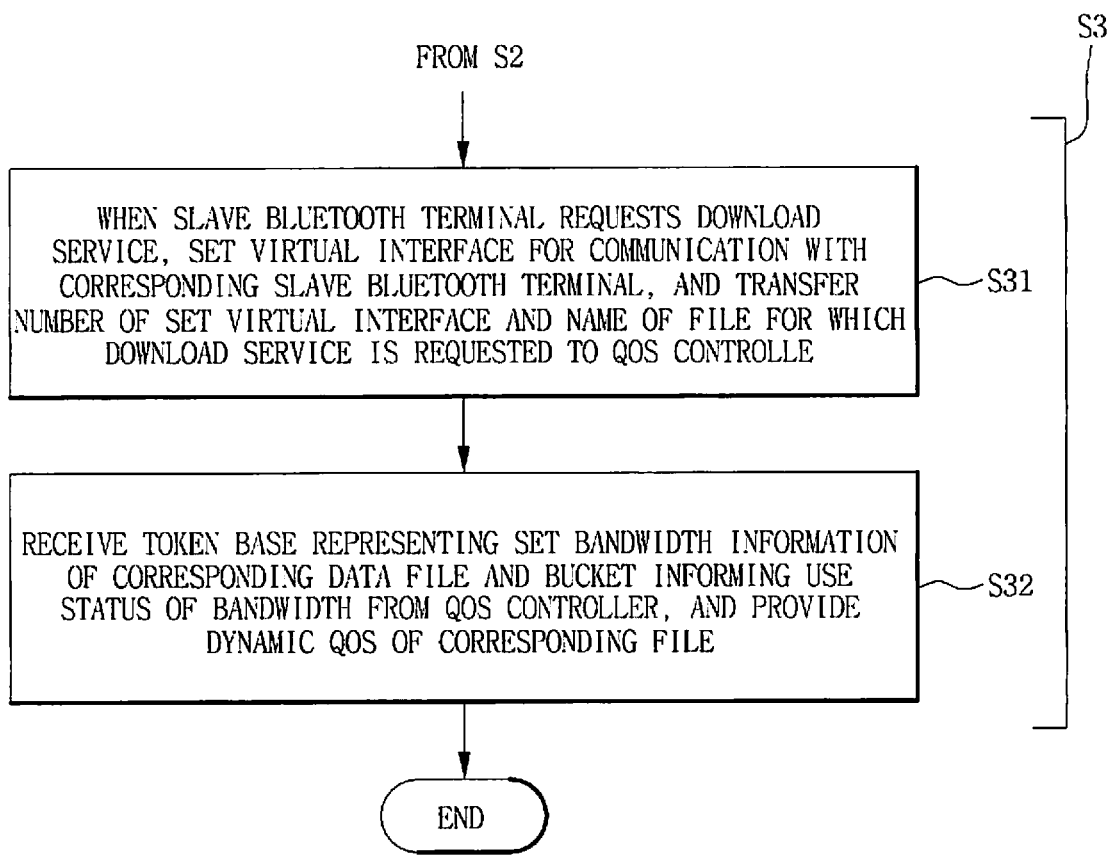
FIG. 3 illustrates details of step S3 in the method of FIG. 2.

Hereinafter, step S3 of providing the download service of the file to the slave Bluetooth® terminal will be described in greater detail with reference to FIG. 3.

When the slave Bluetooth® terminal requests the download service, the balancing BNEP 400 sets a virtual interface for communication with the corresponding slave Bluetooth® terminal, and transfers a number of the set virtual interface and a name of the file for which download service is requested to the QoS controller 300 (S31).

Then, the balancing BNEP 400 receives a token base representing the set bandwidth information of the corresponding data file and a bucket informing a use status of the bandwidth from the QoS controller 300, and provides dynamic QoS of the corresponding file (S32).

While the present invention has been described with reference to certain preferred embodiments thereof, it will be understood by those skilled in the art that various changes in form and details may be made therein without departing from the spirit and scope of the present invention as defined by the appended claims.

What is claimed is:

1. An apparatus for controlling a Quality of Service (QoS) of a master Bluetooth® terminal in a piconet, the apparatus comprising:
    a file-specific band setting unit for setting information about files and information about bandwidths set for the files, both of which are stored in the master Bluetooth® terminal, for a content meta database;
    a balancing Bluetooth® Network Encapsulation Protocol (BNEP) for, when a slave Bluetooth® terminal requests download service of one of the files, creating a virtual interface for communication with the slave Bluetooth® terminal, transferring a number of the virtual interface and a name of the one of the files to a QoS controller, setting a bandwidth of the virtual interface to a bandwidth of the one of the files when information about the bandwidth set for the one of the files is received from the QoS controller, and providing the download service to the slave Bluetooth® terminal; and
    the QoS controller for checking the content meta database based on the name of the one of the files from the balancing BNEP, and providing the information about the bandwidth set for the one of the files to the balancing BNEP.

2. The apparatus of claim 1, wherein the content meta database includes a policy table including file type information, encoding rate information, and the set bandwidth information, as well as a content meta table in which the file-specific band setting unit stores file name information, the file type information, and the set bandwidth information, all of which are stored in the master Bluetooth® terminal, on a basis of the policy table.

3. The apparatus of claim 1, wherein after transferring the number of the virtual interface and the name of the one of the files, the balancing BNEP is configured to receive a token base representing the information about the bandwidth of the one of the files as well as a bucket informing a use status of the bandwidth from the QoS controller and to provide a dynamic QoS of the one of the files.

4. A method for controlling a Quality of Service (QoS) of a master Bluetooth® terminal in a piconet, the method comprising:
   setting information about files and information about bandwidths set for the files, both of which are stored in the master Bluetooth® terminal, for a content meta database, at a file-specific band setting unit;
   creating a virtual interface for communication with a slave Bluetooth® terminal, when the slave Bluetooth® terminal requests download service of one of the files, at a balancing Bluetooth® Network Encapsulation Protocol (BNEP);
   transferring a number of the virtual interface and a name of the one of the files from the balancing BNEP to a QoS controller;
   checking the content meta database based on the name of the one of the files, at the QoS controller;
   providing information about a bandwidth set for the one of the files from the QoS controller to the balancing BNEP;
   setting a bandwidth of the virtual interface to the bandwidth set for the one of the files at the balancing BNEP;
   providing the download service of the one of the files to the slave Bluetooth® terminal at the balancing BNEP.

5. The method of claim 4, wherein the setting of the information about files and the information about bandwidths set for the files includes setting a content meta table, in which the file-specific band setting unit stores file name information, file type information and set bandwidth information, all of which are stored in the master Bluetooth® terminal, on a basis of a policy table including the file type information, encoding rate information and the set bandwidth information preset for the content meta database.

6. The method of claim 5, wherein providing information about the bandwidth comprises:
   receiving, at the balancing BNEP, a token base representing the information about the bandwidth of the one of the files and a bucket informing a use status of the bandwidth, from the QoS controller, and providing a dynamic QoS of the one of the files.

* * * * *

UNITED STATES PATENT AND TRADEMARK OFFICE
CERTIFICATE OF CORRECTION

PATENT NO.       : 8,401,523 B2                                   Page 1 of 1
APPLICATION NO.  : 12/570802
DATED            : March 19, 2013
INVENTOR(S)      : In-Ho Kim It is certified that error appears in the above-identified patent and that said Letters Patent is hereby corrected as shown below:

On the Title Page

Item (30) Foreign Application Priority Data:

"Jul. 10, 2008" should be --Oct. 7, 2008--.

Signed and Sealed this
Twenty-fourth Day of September, 2013

Teresa Stanek Rea
*Deputy Director of the United States Patent and Trademark Office*